United States Patent [19]

Hazen et al.

[11] Patent Number: 4,606,764

[45] Date of Patent: Aug. 19, 1986

[54] METHOD OF RECOVERING METALS FROM ORES USING A FORMATE REDUCING AGENT

[75] Inventors: Wayne C. Hazen, Denver; Enzo L. Coltrinari, Arvada; John E. Litz, Lakewood; David L. Thompson, Golden, all of Colo.

[73] Assignee: Resource Technology Associates, Boulder, Colo.

[21] Appl. No.: 690,743

[22] Filed: Jan. 11, 1985

Related U.S. Application Data

[63] Continuation-in-part of Ser. No. 524,025, Aug. 17, 1983.

[51] Int. Cl.[4] .................................................. C22B 5/00
[52] U.S. Cl. ....................................... 75/101 R; 75/2; 75/108; 75/115; 75/119; 75/117; 423/26; 423/36; 423/41; 423/42; 423/45; 423/146; 423/150
[58] Field of Search ............... 423/27, 26, 42, 36, 423/41, 140, 145, 146, 150; 75/108, 101 R, 115, 117, 119, 2

[56] References Cited

U.S. PATENT DOCUMENTS

| | | | |
|---|---|---|---|
| 1,472,115 | 10/1923 | Clark | 75/108 |
| 1,686,391 | 10/1928 | Muller et al. | 75/108 |
| 2,239,519 | 8/1941 | Gurwood | 75/108 |
| 2,690,425 | 9/1954 | Moses et al. | 423/DIG. 18 |
| 3,464,885 | 9/1969 | Land et al. | 166/61 X |
| 3,606,999 | 9/1971 | Lawless | 210/63 R X |
| 3,640,703 | 2/1972 | Cooper | 75/101 R |
| 3,853,759 | 12/1974 | Titmas | 210/63 R |
| 3,917,519 | 11/1975 | Fisher et al. | 423/37 |
| 4,008,076 | 2/1977 | Junghauss et al. | 423/36 |
| 4,116,488 | 9/1978 | Hsueh et al. | 75/117 |
| 4,234,560 | 11/1980 | Kuerten et al. | 423/659 |
| 4,272,383 | 6/1981 | McGrew | 210/741 |
| 4,322,390 | 3/1982 | Tolley et al. | 423/27 |
| 4,350,599 | 9/1982 | Chowdhury | 423/206 R |

OTHER PUBLICATIONS

Considine, Van Nostrand's Scientific Encyclopedia, 6th ed. p. 1262.

*Primary Examiner*—John Doll
*Assistant Examiner*—Robert L. Stoll
*Attorney, Agent, or Firm*—Sheridan, Ross & McIntosh

[57] ABSTRACT

The invention comprises the treatment of metal oxides and mixed metal oxides and metal sulfides in a vertical tube reactor system having a downcomer section and a riser section in order to oxidize and dissolve the metal values in aqueous slurry primarily in the downcomer section and introducing a reducing agent comprising a formate species and reducing the dissolved metal values in the riser section. The reduced metal values are then separated with the gangue values from the product solution downstream from the vertical tube reactor system. The reduced metal values may then be separated from the gangue material by conventional solid separation techniques, such as flotation.

15 Claims, No Drawings

METHOD OF RECOVERING METALS FROM ORES USING A FORMATE REDUCING AGENT

This application is a continuation-in-part of U.S. patent application Ser. No. 524,025, filed Aug. 17, 1983.

FIELD OF INVENTION

This invention relates to the processing of metal oxides and mixed metal oxides and metal sulfides, particularly copper oxides and mixed copper oxides and copper sulfides, in a vertical tube reactor in order to accomplish both oxidation and reduction of the metal values.

BRIEF DESCRIPTION OF THE PRIOR ART

Many metallurgical processes include the dissolution of valuable constituents such as copper at elevated temperatures and pressures. The majority of these processes react the metal values of the ore or concentrate with acid or alkali in an agitated pressure vessel, sometimes in the presence of an oxidizing or a reducing gas. In addition, a large number of metallurgical processes begin with furnace oxidation of sulfides or carboniferous materials. Such a step is quite often environmentally restrictive and may require significant energy input.

Reaction systems are disclosed which accomplish the oxidated dissolution of various materials in a vertical tube reactor configuration. U.S. Pat. No. 4,272,383 to McGrew, along with various references cited therein, disclose such systems, along with particular processing conditions deemed suitable for accomplishing their particular results.

Upon completion of the processing such as disclosed in McGrew, the resultant leach liquor products are removed from the reaction vessel and further processed as desired for metal recoveries. The present application deals with techniques whereby the metal values are not only oxidized and dissolved in the reaction system, but the metal values are also subsequently reduced and precipitated in their elemental form prior to leaving the reaction vessel.

Many commonly used reductants are in a gaseous phase at ambient temperatures and atmospheric pressures. Thus a high-pressure gas handling system and high-pressure gas lines within the reactor are typically required by prior methods. Such a system is expensive and presents safety problems which must be dealt with.

Accordingly, it would be advantageous to have a method which enhances the reactivity of the copper contained in $CuFeS_2$ in order to decrease the inefficiency experienced when treating $CuFeS_2$ for copper recovery. Similarly, it would be advantageous to have a process system wherein mixtures of copper oxide and disseminated copper sulfide could be effectively treated to recover all of the copper without the need for environmentally unacceptable methods of eliminating the sulfides such as by roasting. Non-sulfide copper ores leach readily in sulfuric acid solutions and present no particular leaching problems. However, many oxide ores contain significant amounts of sulfide mineralization. These ores do not respond readily to conventional acid leaching and as such it would be advantageous to have a process from which all of the copper could be recovered.

Further, it would be advantageous to provide a reducing agent which is in a non-gaseous phase at ambient temperatures and atmospheric pressures. Since copper reduction by hydrogen gas is well understood, it would be particularly helpful if the non-gaseous reducing agent had the the effect of releasing a hydrogen species.

In addition, copper metal cannot be produced by hydrogen reduction of copper sulfate solutions in the presence of elemental sulfur or sulfides (pyrite) due to the formation of cupric sulfide. Accordingly, it would be advantageous to have a process wherein the solubilized copper from a mixture of copper sulfide/oxide feed material can nevertheless undergo hydrogen reduction to copper metal. These and other advantages are provided by practice of the processes of the present invention.

SUMMARY OF THE INVENTION

The invention comprises the treatment of metal oxides and mixed metal oxides and metal sulfides in a vertical tube reactor system having a downcomer section and a riser section in order to oxidize and dissolve the metal values in aqueous slurry, preferably in the downcomer section and introducing a formate reducing agent so as to reduce the dissolved metal values preferably in the riser section. The reduced metal values are then separated with the gangue values from the product solution downstream from the vertical tube reactor system. The reduced metal values may then be separated from the gangue material by conventional solid separation techniques, such as flotation.

The invention is particularly applicable to copper oxides and mixed copper oxides and copper sulfides wherein the feed material is slurried and injected into the downcomer of the vertical tube reactor system in the presence of sulfuric acid and/or oxygen. The system becomes increasingly pressurized as the reactants travel through the downcomer portion of the reactor system, and are permitted to travel to a depth sufficient to oxidize and solubilize the copper values. A reducing agent, specifically a formate species, is introduced into the system following completion of the oxidation reaction, preferably in the riser section of the reactor. The copper values are then reduced to elemental copper during the upflow of the product slurry. Upon exiting the vertical tube reactor system, the leach solution is separated from the precipitated copper and residual gangue material, and the solids are further processed by flotation in order to separate the copper from the gangue material.

DESCRIPTION OF THE PREFERRED EMBODIMENTS

The process of the present invention utilizes a vertical tube reactor system, particularly the hydrostatic head pressures inherent therein, in order to process various metal oxides and mixed metal oxides and metal sulfides. The reactor design is typically vertical, with a downcomer portion, which is generally a cylindrical pipe, and a riser portion, which is also generally a cylindrical pipe. A preferred configuration is a U-tube wherein one leg comprises the downcomer and the adjacent leg comprises the riser. Another preferred configuration is an annular piping arrangement wherein the downcomer generally comprises an internal cylindrical pipe and the riser comprises the concentric outside annular ring. It is not necessary that the reactor configuration be truly vertical, as long as the feed material is introduced into the reactor system at a location sufficiently elevated from the primary reaction zone portion of the system so as to generate sufficient hydrostatic head pressure.

The dimensions of the downcomer and riser portions of the reactor system are designed so as to accomplish a feed slurry flow rate and reactor residence time sufficient to accomplish the oxidative dissolution reaction and the metal precipitate reduction reaction. The reactor length is primarily a function of the desired reaction pressure.

Feed materials suitable for the process of the present invention include metal-containing ores, primarily metal oxide ores and mixed metal oxide and metal sulfide ores, along with scrap metal values, which are amenable to oxidative pressure leaching and subsequent slurry reduction. Metal values particularly suitable for the present process include nickel and cobalt values from laterite ores and copper values from copper oxide ores and mixed copper oxide/copper sulfide ores. Suitable feed materials also include unreacted metal values which are recycled from previous processing.

Ore feed materials which contain significant amounts of acid consuming impurities are preferably concentrated, such as by flotation, prior to being introduced into the reactor system. The ore and/or concentrate may be pre-treated in order to obtain a more preferred balance of oxides to sulfides ratio. For example, when treating chalcopyrite ore, which is primarily a refractory mixed copper-iron sulfide ore, the chalcopyrite is preferably initially leached with a copper sulfate solution under processing conditions suitable to produce simple copper sulfides, such as chalcocite, covellite and digenite. These sulfides may then be blended with copper oxide feed materials.

The feed material prior to entering the reaction system is crushed and sized to a slurriable size. A slurry is formed of the crushed, sized ore. The particular selection of particle sizes and slurry solids contents are functions of the selection of the balance of the processing variables, as is appreciated in the art.

The oxidizing agent is mixed with the slurry, generally prior to conveying the slurry to a first "oxidizing" section of the reaction system. If the feed material contains sufficient sulfide values, the oxidizing agent is preferably oxygen, as sulfuric acid is then formed in situ. When processing feed materials with insufficient sulfides content, the desired oxidizing agent, for example, sulfuric acid, is mixed with the feed material prior to introduction into the reaction system. Alternatively, it may be convenient or desirable to introduce the oxidizing agent after the slurry enters the reactor.

The temperature and pressure in the oxidizing section must be an oxidation-effective temperature and pressure. As used herein, an "oxidation-effective temperature and pressure" is a temperature and pressure which is sufficient to oxidize substantially all the metal in the slurry after the oxidizing agent has been added. Preferred temperature and pressure conditions are dependent upon the feed material, the oxidizing agent, reaction residence time, degree of metal dissolution desired, and the selection of the balance of processing variables. When dealing with feed materials containing sulfides, it is generally preferred to maintain the process at a temperature in excess of the melting point of sulfur, i.e. 119° C., as below this temperature elemental sulfur forms and interferes with the subsequent reduction reaction. Processing pressures of from about 50 to about 800 psig are generally suitable, depending upon the selection of the other processing variables. The slurry is maintained at an oxidation-effective temperature and pressure for a time sufficient to substantially oxidize the metal in the ore.

The vertical tube reactor system is preferably designed so as to complete the oxidative dissolution of the metal values in the downcomer portion of the reactor design. A reducing agent is then introduced into a reduction zone within the reactor in order to accomplish the reduction and precipitation of the dissolved metal values. According to the process of this invention, the reducing agent is a formate species. As used herein, "formate species" refers to a species, which at the reduction zone temperatures and pressures, produces formate ions. A formate ion is an ion with the structural formula:

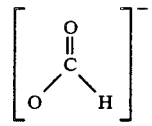

Examples of formate species are: potassium formate, sodium formate, carbon monoxide (in basic solution), and formic acid.

The formate ion can produce hydrogen by a reaction, similar to the "water-gas shift" reaction. According to this reaction, an aqueous solution of formate ions decomposes under certain conditions to form an active hydrogen species, carbon dioxide and hydroxyl ions.

A reducing agent which produces hydrogen such as a formate ion is particularly useful when sulfur is present in the ore. The formate ion is also particularly useful as a reductant since it is a polar ion which can react in ways that non-polar molecular hydrogen cannot. It produces the equivalent of a hydride ion:

$$COOH^- \rightarrow CO_2 + H^-$$

Formate ions can be produced by dissolution of such formate compounds as potassium formate, sodium formate, and formic acid. Potassium is particularly useful because of its high solubility in water. Formate ions are also formed by introducing carbon monoxide to a basic water solution. Carbon monoxide can thus be converted under mild conditions to a low volatility reducing agent that does not involve a high partial pressure of gas.

The present process, then, makes possible introduction of a hydrogen-producing reducing agent which avoids the necessity of a high-pressure gas handling system. This avoidance is advantageous for reactions carried out in a vertical tube reactor and particularly in a subterranean reactor because it avoids both the surface high-pressure gas handling system, and the necessity for down-hole high-pressure gas lines and other systems required for introduction of a high-pressure gas. The reducing agent is preferably introduced directly into the riser section of the reactor.

As will be known and understood by those skilled in the art, formate species may be employed in processes other than recovery of precious metals from ores, as either a reducing agent or a hydrogen-producing reagent and are are particularly useful as such in a subterranean vertical reactor environment.

The mixture of the formate with the slurry containing dissolved, oxidized metal values is conveyed to a second "reducing" section of the reactor, preferably the riser section, having a reduction-effective temperature and pressure. As used, herein, a "reduction-effective temperature and pressure" is a temperature and pressure which is sufficient to substantially reduce the dissolved metal values in the presence of formate ions, whereby elemental metal is formed. The remainder of the slurry forms a gangue material. The mixture is maintained at a reduction-effective temperature and pressure for a time sufficient to reduce substantially all the metal values.

Upon exiting the riser portion of the reaction system the metal values amenable to the processing exist in precipitated form in the slurry. The process liquor is preferably separated from the solids, and the solids may then be treated for the further recovery of the metal values. One particularly preferred technique, particularly with respect to the processing of copper ores, includes flotation. The resulting gangue material from this separation may then be further processed for the recovery of residual values or otherwise suitably discarded.

The following examples are provided by way of illustration and not by way of limitation.

EXAMPLE 1

Two series of tests were performed to evaluate pressure leaching time, temperature and oxygen partial pressure on the copper dissolution after pretreatment with copper sulfate. Tests 2 and 4 reacted two moles of copper sulfate for each mole of copper as sulfide. For Tests 1, 3, 5, 6 and 7 the copper sulfate to sulfide ratio was one. Table 1 summarizes the test data, while Table 1(a) provides the information in detail.

TABLE 1

Pressure Leach of Copper Concentrates

Summary of Results

| Ore concentrate head assay | Element | % |
|---|---|---|
| | Cu | 26.8 |
| | Fe | 25.1 |
| | S | 30.1 |
| | Zn | 6.9 |
| | Pb | 0.33 |
| Conversion conditions: | Temperature, °C. | 200 |
| | Time, hour | 2 |
| | Agitation, rpm | 800 |

Leaching Results

| CuSO$_4$/Cu mole ratio | 1 | | | | | 2 | |
|---|---|---|---|---|---|---|---|
| Test No. | 7 | 1 | 3 | 5 | 6 | 2 | 4 |
| Temperature, °C. | 110 | 110 | 110 | 150 | 200 | 110 | 110 |
| Pressure, psig | 200 | 450 | 600 | 500 | 700 | 450 | 600 |
| Cu extracted, % at: | | | | | | | |
| 1 hour | 18 | 70 | 30 | 41 | 50 | 27 | 87 |
| 2 hours | 50 | 75 | 62 | 64 | 99 | 84 | 79 |
| 3 hours | 72 | 81 | 74 | 87 | 99 | 91 | 91 |

TABLE 1(a)

Test Data: Pressure Leaching Copper Sulfide Concentrate
Feed Ore Concentrate: 26.8% Cu, 25.1% Fe, 30.5% S, 6.9% Zn, 0.3% Pb
Ground to 8.7% on 325-mesh, 82% passing 400-mesh

| Test Number: | 1 | | 2 | | 3 | | 4 | |
|---|---|---|---|---|---|---|---|---|
| Conversion Leach | | | | | | | | |
| Mole Ratio: Cu++/Cu | 1 | | 2 | | 1 | | 2 | |
| Solution: | | | | | | | | |
| Cu, g/l | 23 | | 33 | | 22 | | 31 | |
| Fe++, g/l | 8.2 | | 7.3 | | 7.5 | | 7.6 | |
| H$_2$SO$_4$, g/l | 38 | | 39 | | 39 | | 39 | |
| Pulp Density, % solids | 8 | | 6 | | 8 | | 6 | |
| Temperature, C. | 200 | | 200 | | 200 | | 200 | |
| Sample Time, hours | 1 | 2 | 1 | 2 | 1 | 2 | 1 | 2 |
| Filtrate: | | | | | | | | |
| Cu, g/l | 0.98 | 0.001 | 1.14 | 0.001 | 0.23 | 0.001 | 1.07 | 0.001 |
| Fe, g/l | 22.0 | 19.1 | 18.5 | 19.5 | 21.3 | 22.6 | 19.1 | 20.3 |
| H$_2$SO$_4$, g/l | 42.2 | 50.6 | 62.4 | 65.2 | 44.2 | 42.9 | 63.2 | 66.9 |
| Vapor phase odor | strong H$_2$S | | some H$_2$S | | some H$_2$S | | some H$_2$S | |
| Oxidation Leach | | | | | | | | |
| Temperature, C. | 110–115 | | 110–115 | | 110–115 | | 110–115 | |
| Oxygen Pressure, psi | 450 | | 450 | | 600 | | 600 | |
| Oxygen Consumption, lb/t | 640 | | 320 | | 340 | | 340 | |
| Sample Time, hours | 1 | 2 | 3 | 1 | 2 | 3 | 1 | 2 | 3 | 1 | 2 | 3 |
| Copper Extraction % | 70 | 75 | 81 | 27 | 84 | 91 | 30 | 62 | 74 | 87 | 79 | 91 |
| Residue: Cu, % | 16.0 | 6.9 | 5.6 | 32.5 | 4.8 | 2.8 | 50.2 | 40.9 | 8.0 | 58.4 | 6.7 | 2.9 |
| Filtrate: | | | | | | | | | | | | |
| Cu, g/l | 30.8 | 40.0 | 43.0 | 39.5 | 47.3 | 50.0 | 8.5 | 20.0 | 40.8 | 22.2 | 45.5 | 48.5 |
| Fe, g/l | 12.5 | 4.0 | 3.5 | 13.9 | 6.6 | 6.1 | 23.3 | 23.3 | 6.7 | 20.8 | 11.2 | 9.5 |
| H$_2$SO$_4$, g/l | 4.4 | 6.3 | 6.9 | 2.4 | 6.2 | 7.4 | 27.9 | 5.4 | 4.1 | 31.9 | 5.1 | 4.4 |
| pH | 1.4 | 1.4 | 1.4 | 1.5 | 1.3 | 1.2 | 0.6 | 1.2 | 1.4 | 0.5 | 1.4 | 1.4 |
| EMF, mv | 400 | 440 | 480 | 443 | 463 | 478 | 347 | 405 | 479 | 375 | 445 | 490 |

| Test Number: | 5 | | 6 | | 7 | |
|---|---|---|---|---|---|---|
| Conversion Leach | | | | | | |
| Mole Ratio: Cu++/Cu | 1 | | 1 | | 1 | |
| Solution: | | | | | | |
| Cu, g/l | 22 | | 22 | | 22 | |
| Fe++, g/l | 8.0 | | 8.0 | | 8.0 | |
| H$_2$SO$_4$, g/l | 40 | | 40 | | 40 | |
| Pulp Density, % solids | 8 | | 8 | | 8 | |
| Temperature, C. | 200 | | 200 | | 200 | |
| Sample Time, hours | 1 | 2 | 1 | 2 | 1 | 2 |
| Filtrate: | | | | | | |
| Cu, g/l | 0.32 | 0.001 | 0.19 | 0.001 | 0.15 | 0.001 |
| Fe, g/l | 23.5 | 21.1 | 20.7 | 22.3 | 22.3 | 21.7 |
| H$_2$SO$_4$, g/l | 42.9 | 42.6 | 43.9 | 43.2 | 46.0 | 42.2 |

TABLE 1(a)-continued

Test Data: Pressure Leaching Copper Sulfide Concentrate
Feed Ore Concentrate: 26.8% Cu, 25.1% Fe, 30.5% S, 6.9% Zn, 0.3% Pb
Ground to 8.7% on 325-mesh, 82% passing 400-mesh

| | | | | | | | | | |
|---|---|---|---|---|---|---|---|---|---|
| Vapor phase odor | some $H_2S$ | | | some $H_2S$ | | | some $H_2S$ | | |
| Oxidation Leach | | | | | | | | | |
| Temperature, C. | 150 | | | 200 | | | 110–115 | | |
| Oxygen Pressure, psi | 500 | | | 700 | | | 200 | | |
| Oxygen Consumption, lb/t | 1680 | | | 1060 | | | 280 | | |
| Sample Time, hours | 1 | 2 | 3 | 1 | 2 | 3 | 1 | 2 | 3 |
| Copper Extraction % | 41 | 64 | 87 | 50 | 99 | 99 | 18 | 50 | 72 |
| Residue: Cu, % | 50.2 | 44.4 | 4.1 | 24.9 | 0.68 | 0.41 | 50.5 | 43.5 | 8.2 |
| Filtrate: | | | | | | | | | |
| Cu, g/l | 13.8 | 26.8 | 43.8 | 42.6 | 46.1 | 49.5 | 4.4 | 14.6 | 39.2 |
| Fe, g/l | 22.2 | 23.1 | 20.3 | 24.5 | 8.4 | 5.2 | 22.8 | 21.7 | 5.1 |
| $H_2SO_4$, g/l | 28.3 | 26.5 | 9.9 | 31.7 | 58.9 | 73.2 | 34.6 | 15.4 | 2.7 |
| pH | 0.7 | 0.7 | 1.0 | 0.6 | 0.25 | 0.1 | 0.6 | 1.0 | 1.7 |
| EMF, mv | 346 | 379 | 520 | 354 | 470 | 560 | 274 | 395 | 454 |

EXAMPLE 2

A series of tests was performed to evaluate sulfuric acid-oxygen pressure leaching of a mixed sulfide-oxide ore. The results of these tests are summarized in Table 2.

TABLE 2

Pressure Leaching Mixed Sulfide-Oxide Copper Ore

| Ore: | 0.52% total Cu | | | | | |
|---|---|---|---|---|---|---|
| | 0.22% oxide Cu | | | | | |
| | 7.3% Fe | | | | | |
| | 0.07% S | | | | | |
| Conditions: | 50% solids, 110° C. | | | | | |
| | (except Test 3 = 160° C.) | | | | | |
| | 0.75 initial pH, 2 hours | | | | | |
| Test No. | 1 | 2 | 3 | 4 | 5 | 6 |
| Grind, mesh | 65 | 65 | 65 | 65 | 100 | 100 |
| Oxygen pressure, psi | 50 | 200 | 200 | 450 | 50 | 200[1] |
| Copper solubilized | 56 | 54 | 53 | 55 | 54 | 58 |
| Residue: | | | | | | |
| Copper, % | 0.23 | 0.24 | 0.25 | 0.24 | 0.24 | 0.24 |
| Oxide copper, % | 0.02 | 0.02 | 0.03 | 0.03 | 0.02 | 0.03 |

[1]Added 5 g ferric ion/liter to feed pulp.

Most of the tests were performed at 110° C.; however, Test 3 was performed at 160° C. 5 grams per liter of ferric ion were added to the leach feed in Test 6 to determine whether the oxidation of sulfides was catalyzed by the presence of soluble iron. The residual sulfide copper content from this 110° C. pressure leach was about 90% of the value in an identical test without added iron (Test 2).

EXAMPLE 3

A series of tests were performed to establish the effect of the hydrogen overpressure when hydrogen reducing copper sulfate solutions simulating the filtrate from a pressure leach of concentrates. The data from these tests are tabulated in Table 3.

TABLE 3

Hydrogen Reduction Tests at 160° C.

| Feed solution assays: | Element | g/l | Element | g/l |
|---|---|---|---|---|
| | Cu | 45.0 | $H_2SO_4$ | 6.9 |
| | $Fe^{Tot}$ | 3.5 | pH | 1.3 |
| | $Fe^{+2}$ | 0.30 | emf, mv | −470 |

| Test No. | 1 | 2 | 3 | 4 | 5 |
|---|---|---|---|---|---|
| Pressure, psig | 150 | 225 | 300 | 400 | 225 |
| Cu, g/l: | | | | | |
| Sample 1 hour | 37.6 | 32.6 | 24.5 | 22.2 | 22.2 |
| 2 | 32.6 | 27.8 | 11.8 | 9.3 | 9.32 |
| 3 | 30.4 | 22.7 | 7.65 | 6.60 | 6.60 |
| 4 | 28.3 | 17.4 | 6.05 | 5.21 | 5.21 |
| 5 | 26.6 | 11.9 | 4.42 | 3.62 | 3.62 |

[1]Seeded with 2 g/l Cu°. Copper plating prevailed.

EXAMPLE 4

A series of tests were run to compare the effect on copper extraction when chalcopyrite was treated before leaching with copper sulfate and temperatures below the melting point of S are used. The test conditions and results are provided in Table 4 without pre-leach and in Table 5 when a pre-leach is employed.

TABLE 4

Pressure Leach of Chalcopyrite Concentrates

| | | | | | | | |
|---|---|---|---|---|---|---|---|
| Chalcopyrite concentrates | 24.2% Cu, 26.6% Fe, 28.4% S | | | | | | |
| Autoclave | 2-liter Parr | | | | | | |
| Slurry volume | 1–1.2 liter | | | | | | |
| Temperature | 108–117° C. | | | | | | |
| Time | 4 hours | | | | | | |
| Test | 1 | 2 | 3 | 4 | 5 | 6 | 7 |
| Feed, Wt % | | | | | | | |
| Concentrate | 75 | 75 | 75 | 75 | 33.3[2] | 75 | 100 |
| Pyrite | 25 | 25 | 25 | 25 | 11.1[2] | 25 | 0 |
| Sand | | | | | 55.6[3] | | |
| Grind, mesh | −200 | −325 | −200 | −325 | −325 | −325 | −325 |
| Solution, | | | | | | | |
| g/l $H_2SO_4$ | 30 | 30 | 30 | 61 | 61 | pH 8.5 | pH 8.5 |
| g/l Fe | | | | | | 60.5 | 58.0 |
| Pulp density, g/l solids | 167 | 167 | 167 | 167 | 375 | 83 | 62.5 |
| Oxidant | $O_2$ | $O_2$ | $O_2$ | $O_2$ | $O_2$ | $Fe^{+3}$ | $Fe^{+3}$ |
| Pressure, psig total | 420 | 415 | 420 | 420 | 410 | 20 | 20 |
| Agitation[1] | Mild | Mild | Vigorous | Mild | Mild | Mild | Mild |
| % Cu extracted | 42 | 53 | 47 | 58 | 34 | 41 | 39 |

TABLE 4-continued

| Pressure Leach of Chalcopyrite Concentrates | | | | | | | |
|---|---|---|---|---|---|---|---|
| Chalcopyrite concentrates | | | 24.2% Cu, 26.6% Fe, 28.4% S | | | | |
| Autoclave | | | 2-liter Parr | | | | |
| Slurry volume | | | 1–1.2 liter | | | | |
| Temperature | | | 108–117° C. | | | | |
| Time | | | 4 hours | | | | |
| Test | 1 | 2 | 3 | 4 | 5 | 6 | 7 |
| Residue, % Cu | 12.3 | 11.5 | 10.8 | 14.4 | 4.72 | 15.0 | 20.8 |
| Solution, | | | | | | | |
| g/l Cu | 13.2 | 14.1 | 13.7 | 14.5 | 9.20 | 6.08 | 6.00 |
| g/l Fe | 11.5 | 8.1 | 11.6 | 30.0 | 21.3 | 74.8 | 66.8 |
| g/l $Fe^{+3}$ | | | | | | 26.5 | 29.7 |
| pH | 1.3 | 1.2 | 1.2 | 0.65 | 0.55 | 0.4 | 0.4 |
| emf, mv | 465 | 465 | 465 | 485 | 490 | 407 | 420 |

[1] Mild = downcast impeller at 800 rpm; vigorous = turbine impeller at 1000 rpm.
[2] Acetone wash to remove flotation reagents.
[3] Silica sand, 20- × 30-mesh.

TABLE 5

| Cu Recovery from Concentrate by Pretreatment/Pressure Leach and $H_2$ Reduction of $CuSO_4$ Leach Solution | |
|---|---|
| Concentrates: | 24.2% Cu, 26.6% Fe, 28.4% S |
| Pretreatment | In 2-liter Parr autoclave |
| Concentrate | 90 g, minus 325-mesh |
| Solution | 1200 ml; 20.2 g/l Cu (as $CuSO_4$) + 5.0 g/l $H_2SO_4$ |
| Temperature | 200° C. |
| Pressure | 230 psig (steam only) |
| Time | 2 hours |
| Agitation | Downcast impeller, 800 rpm |
| Treated solids | 52.1% Cu, 10.2% Fe; containing major $Cu_9S_5$ (digenite) $CuFeS_2$ and subordinate CuS (covellite) and $FeS_2$ |
| Solution | Less than 0.001 g/l Cu, 12.6 g/l Fe, 18.9 g/l $H_2SO_4$, emf = 280 mv |
| Reactions | 3 $CuFeS_2$ + 6 $CuSO_4$ + 4 $H_2O$ → $Cu_9S_5$ + 3 $FeSO_4$ + 4 $H_2SO_4$ |
| | $CuFeS_2$ + $CuSO_4$ → 2 CuS + $FeSO_4$ |
| Leach | In 2-liter Parr autoclave |
| Slurry | From pretreatment, 1177 g (80 g solids, 1.0 liter solution) |
| $H_2SO_4$ added | 42 g |
| Temperature | 106–109° C. |
| Pressure | 425 psig ($O_2$ + steam), no bleed |
| Agitation | Downcast impeller, 800 rpm |
| Cu extraction | 73% at 1 hr, 92% at 2 hr, 92% at 3 hr |
| Reactions | $Cu_9S_5$ + 9 $H_2SO_4$ + 4.5 $O_2$ → 9 $CuSO_4$ + 5 S° + 9 $H_2O$ |
| | $CuFeS_2$ + $H_2SO_4$ + 1.25 $O_2$ + 0.5 $H_2O$ → $CuSO_4$ + $Fe(OH)_3$ + 2 S° |
| | CuS + $H_2SO_4$ + 0.5 $O_2$ → $CuSO_4$ + S° + $H_2O$ |
| | 6 $FeSO_4$ + 1.5 $O_2$ + 9 $H_2O$ → 2 $HFe_3(SO_4)_2(OH)_6$ + 2 $H_2SO_4$ |
| $H_2$ reduction | In 2-liter Parr autoclave |
| Solution | Filtrate from leach; 980 ml — 30.7 g/l Cu, 8 g/l $H_2SO_4$, 7.18 g/l Fe, emf = 480 mv |
| Temperature | 200° C. |
| Pressure | 400 psig ($H_2$ + steam) |
| Cu precipitated | 79% at 15 min, 88% at 1 hr, 94% at 1.5 hr |
| Solution (1.5 hr) | 1.99 g/l Cu, 7.14 g/l Fe, 59 g/l $H_2SO_4$, emf = 310 mv |
| Cu precipitate | 98% Cu, 0.004% Fe, 0.02% S |
| Comment | Majority of precipitated Cu plated to metal (Ti) parts in autoclave. |

EXAMPLE 5

Two tests were performed to evaluate sulfuric acid-oxygen pressure leaching of a synthetic mixed sulfide-oxide ore followed by reduction of the solubilized copper to metal utilizing three different reductants and froth flotation recovery of the metals. Test 2 demonstrates the recovery of metallic copper by flotation after strongly oxidative pressure leaching and hydrogen reduction. Other test conditions and results are provided in Table 6.

TABLE 6

| Leach-Precipitation-Flotation Tests Using Synthetic Ore | | |
|---|---|---|
| Synthetic Ore | 1.0% Cu mixture of (in wt %) 2.1 conc. of Table 4, 2.5 $FeS_2$, 1.4 chrysocolla, 0.40 azurite/malachite, and 93.6 silica sand; minus 200-mesh | |
| Leach conditions | Same for all tests | |
| % solids | 50 | |
| Acidity | Adjusted to pH 1.5 with $H_2SO_4$ | |
| Temperature | 200° C. | |
| Pressure | 320 psig total ($O_2$ + steam) | |
| Agitation | Downcast impeller, 600 rpm | |
| Cu extraction | 98–99% | |
| Precipitation | Test 1 | Test 2 |
| Reductant | Fe powder | $H_2$ |
| Temperature, °C. | 23 | 200 |
| Pressure, psig | Atmospheric | 400 |
| Time, min | 9 | 90 |
| pH | 4.4 | 1.6 |
| Flotation | Same for all tests | |
| No. of stages | Rougher and one cleaner | |
| Reagents | Minerec A, Aerofloat 242, Dowfroth 250 | |
| pH | 3–5 | |
| Cu distribution, % | Test 1 | Test 2 |
| Concentrates | 94.9 | 86.4 |
| Cleaner tails | 4.1 | 3.2 |
| Rougher tails | 1.0 | 1.2 |
| Solutions | 0.1 | 9.2 |
| Cu concentrates assay | | |
| % Cu | 24.5 | 70.8 |
| % Fe | 60.5 | |
| % S | | 0.7 |
| % acid insol | | 28.7 |

EXAMPLE 6

A test was performed to evaluate sulfuric acid leaching of a natural mixed copper oxide-copper sulfide ore at ambient temperature and atmospheric pressure followed by hydrogen reduction of the solubilized copper to the elemental metal and froth flotation recovery of the copper. Samples of the fluid portion and solid portion of the slurry was assessed for copper content after the 45 minute leach and after one hour and two hours of hydrogen reduction. Test conditions and results are given in Table 7.

TABLE 7

| Ore | |
|---|---|
| | By weight % |
| | 1.9% total Cu |
| | 1.3% oxide Cu |
| | 0.6% sulfide Cu, |
| | (primarily as $Cu_2S$) |

TABLE 7-continued

| Leach Conditions | 100 mesh size |
|---|---|
| % solids | 50 |
| Acidity | adjusted to pH 1.5 with $H_2SO_4$ |
| Temperature | ambient — 22° C. |
| Pressure | atmospheric |
| Time | 45 min. |
| Agitation | 800 rpm |
| Precipitation | |
| Reductant | $H_2$ gas |
| Temperature °C. | 160° (166° max.) |
| Pressure, psig | 300 |
| Time | 1 hr; 2 hr samples. |

| | 45 min Leach | | 1 hour Reduced | | 2 hour Reduced | |
|---|---|---|---|---|---|---|
| | Test No: | | | | | |
| | 1 PF | 2 Residue | 3 PF | 4 Solids | 5 PF | 6 Solids |
| pH | 1.6 | | 1.1 | | 1.15 | |
| wt/vol (g/l) | 36.2 | 35.1 | 43.5 | 39.5 | 37.7 | 35.6 |
| Cu | 11.6 | 0.725 | 0.93 | — | 0.37 | — |
| Fe | 3.30 | — | 7.62 | — | 7.90 | — |

| Flotation | |
|---|---|
| Reagents | $Ca(OH)_2$, Mineric A, Aero 242, Dow Froth 250, Aero 404, 1% |
| rpm | 900 |
| pH | 3.5, except $Ca(OH)_2$ 1.9 to 3.5 |

| Copper | Dry weight (g) | Assay % | Units Cu (g) | Distribution % |
|---|---|---|---|---|
| 1. Cleaner concentrate | 3.00 | 85 | 2.55 | 84.4 |
| 2. Cleaner tails | 4.13 | 2.30 | .095 | 3.1 |
| 3. Scavenger concentrate | 1.83 | 1.77 | .067 | 2.9 |
| 4. Scavenger tails | 140.8 | 0.11 | .155 | 5.1 |
| 5. Scavenger tails solution | 1370 ml | 0.102 g/l (0.801 g/l Fe) | 0.137 | 4.5 |
| Total | 149.8 | 2.01 | 3.024 | 100.0 |

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A process for producing metal values from a metal-containing ore comprising metal oxide ores or mixed metal oxide and metal sulfide ores in a vertical tube reactor having downcomer and riser sections comprising:
   crushing and sizing said ore to a slurriable size;
   forming a slurry with said crushed and sized ore;
   adding an oxidizing agent to said slurry;
   conveying said slurry to a first section of said reactor, having a first pressure of above about 50 p.s.i.g.; to produce a first mixture of dissolved metal and solid gangue material;
   adding a reducing agent comprising formate species to said first mixture producing a second mixture;
   conveying said second mixture to a second section of said reactor, having a second pressure of above about 50 p.s.i.g.;
   maintaining said second mixture at above about p.s.i.g. for a time sufficient to reduce substantially all said dissolved metal values and produce a third mixture of solid elemental metal, solid gangue material and a metal-depleted liquid;
   separating said metal-depleted liquid from said third mixture to produce a fourth mixture comprising said solid elemental metal and said gangue material; and
   separating said solid elemental metal from said fourth mixture.

2. The process of claim 1 wherein said metal is selected from the group consisting of copper, nickel and cobalt.

3. The process of claim 1 wherein said oxidizing agent comprises oxygen.

4. The process of claim 1 wherein said formate species comprises material selected from the group consisting of potassium formate, sodium formate, carbon monoxide in basic solution, and formic acid.

5. The process of claim 1 wherein said first section is within the reactor downcomer and said second section is within the reactor riser.

6. The process of claim 1 wherein said pressure of said first section is between about 50 and about 800 psig.

7. The process of claim 1 wherein said pressure of said second section is between about 50 and about 800 psig.

8. The process of claim 1 wherein the temperature of said first section is at least about 119° C.

9. The process of claim 1 wherein the temperature of said second section is at least about 119° C.

10. The process of claim 1 wherein said reducing agent addition is made in the riser section of said reactor.

11. The process of claim 1 wherein said separation comprises flotation.

12. The process of claim 1 wherein said addition of said oxidizing agent precedes said slurry conveying step.

13. The process of claim 1 wherein said oxidizing agent comprises sulfuric acid.

14. The process of claim 1 wherein said second section is located in said riser section.

15. A process for producing metal values from a metal-containing ore comprising mixed metal oxide and metal sulfide ores in a vertical tube reactor having downcomer and riser sections comprising:
   crushing and sizing said ore;
   forming a slurry with said crushed and sized ore;
   adding oxidizing leaching media to said slurry;
   conveying said slurry to a first section of said reactor, having a temperature above about 119° C. and a pressure between about 50 and 800 psig to produce a first mixture of dissolved metal and solid gangue material;
   adding a reducing agent comprising a formate species to said first mixture to produce a second mixture;
   maintaining said second mixture at a pressure above about 50 p.s.i.g. to accomplish the reduction and precipitation of the dissolved metal values to produce a third mixture of solid elemental metal, solid gangue material and a metal-depleted liquid;
   separating said metal-depleted liquid from said third mixture to produce a fourth mixture comprising said solid elemental metal and said gangue material; and
   separating said elemental metal from said fourth mixture.

* * * * *

UNITED STATES PATENT AND TRADEMARK OFFICE
CERTIFICATE OF CORRECTION

PATENT NO. : 4,606,764

DATED : August 19, 1986

INVENTOR(S) : Hazen et al.

It is certified that error appears in the above—identified patent and that said Letters Patent is hereby corrected as shown below:

Column 8, line 33, Test No. 5 should read -- $5^1$ -- indicating the footnote.

Column 11, line 66, insert -- 50 -- before p.s.i.g.

Signed and Sealed this

Seventeenth Day of March, 1987

Attest:

DONALD J. QUIGG

Attesting Officer

Commissioner of Patents and Trademarks